Mar. 20, 1923.

B. C. WOODFORD

CLEANING FEEDER FOR COTTON GINS

Filed Apr. 10, 1922

1,449,362

Bronson C. Woodford INVENTOR.

BY

Mitchell, Chadwick & Kent ATTORNEYS.

Patented Mar. 20, 1923.

1,449,362

UNITED STATES PATENT OFFICE.

BRONSON C. WOODFORD, OF DALLAS, TEXAS, ASSIGNOR TO THE MURRAY COMPANY, OF DALLAS, TEXAS, A CORPORATION OF TEXAS.

CLEANING FEEDER FOR COTTON GINS.

Application filed April 10, 1922. Serial No. 551,402.

*To all whom it may concern:*

Be it known that I, BRONSON C. WOODFORD, a citizen of the United States, residing at Dallas, in the county of Dallas and State of Texas, have invented certain new and useful Improvements in Cleaning Feeders for Cotton Gins, of which the following is a specification.

My invention is an improved cleaner-feeder for cotton gins, my object being to give the maximum screen surface, over which the seed cotton may be carried to remove sand, trash, etc., within a minimum floor space and size of the mechanism.

Another object is to provide the maximum beater drum surface, with the minimum size of the mechanism, and to cause a multiplicity of beater drums to cooperate to move a stream of seed cotton over screens, passing the stream of seed cotton vertically from one drum to the other, from above downward and from one drum to the other from below upward.

The operation of the feeder or feeder-cleaner for cotton gins is well known in the art and need not be described at length.

Figure 1:
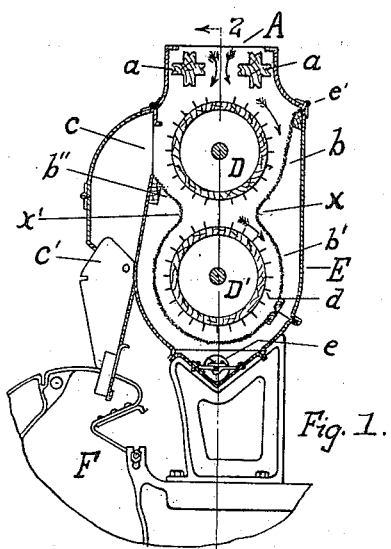
Figure 1 is a cross-sectional elevation of my new feeder-cleaner.
Figure 2:
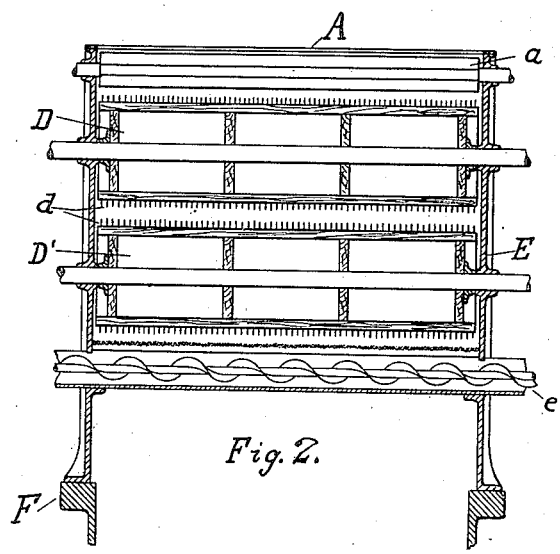
Figure 2 is a longitudinal-sectional elevation of my new cleaner-feeder.
Figure 3:
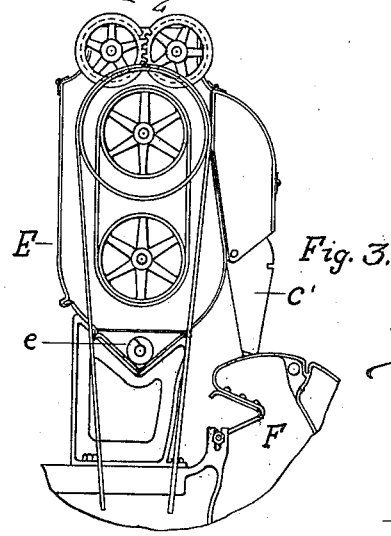
Figure 3 is an end elevation of my new cleaner-feeder.

From a source of seed cotton supply, usually a cotton elevator, beneath a chute of which the feeder-cleaner is disposed, seed cotton falls to the opening A of the feeder and is engaged by the rolls, a, a, turning as indicated by the arrows in Figure 1. The mass received from above is engaged by the rolls, a, and slightly compressed. The rolls, a, are commonly actuated by a ratchet and pawl mechanism to give an intermittent, step-by-step movement, and as the seed cotton passes downward it is engaged by the spiked drum D, turning as indicated by the arrow, Figure 1, and carried around and over the screens, b, to a second drum, D', mounted directly beneath drum D. The screen begins, as above indicated, and follows the surface of drum D at a suitable distance to a point X between the two drums, from which point the screen follows the surface of the drum D' almost entirely around, to a point X' diametrically opposite point X, where it reverses and follows the surface of drum D to the outlet C.

The seed cotton entering at A is urged along screen b until it passes from the influence of drum D to that of drum D' by which it is urged along screen b', downwardly, across the bottom and upward on the other side of drum D', to a point X' where the seed cotton comes again under the influence of drum D by which it is urged upward along screen b'' to the exit C.

In this process the seed cotton is beaten and rubbed over the screens and the sand and trash is forced through the screens to the interior of the casing E and finds its way to the screw conveyor e, for removal from the machine, or if no screw conveyor is provided, the dirt and trash may be removed in any desired fashion.

I have shown in Figure 1, the rear of the casing E mounted on a hinge e'. This is a convenience when it is desired to have access to the interior of the mechanism.

My improved cleaner is especially designed for use in cleaning seed cotton carrying more than the average amount of sand and dirt and under such conditions the greatly increased screen and beater surface, is very useful and effective; furthermore, the vertical arrangement of the drums and the screens makes it possible to obtain the maximum of screen and drum surface with little or no additional floor space.

I claim:

1. In an open-top cleaning feeder for cotton gins, the combination of a plurality of picker drums, arranged vertically one above the other and revolving in the same direction; screens enclosing the upper drum on one side substantially from the top opening and passing downward and around the lower drum and up to the exit opening of the cleaner, the screen following the surface of the drums at a suitable distance therefrom, substantially as and for the purpose described.

2. In an open-top cleaning feeder for cotton gins, the combination of a plurality of picker drums, arranged vertically, one above the other and revolving in the same direction; screens enclosing the upper drum on one side substantially from the top opening and passing downward and around the lower drum and up to the exit opening of the cleaner, the screens spaced from the surface of the drums a suitable distance, substantially as and for the purpose described.

Signed at Dallas, Texas, this 3rd day of April, 1922.

BRONSON C. WOODFORD.